Jan. 12, 1932.   J. A. POWELL   1,840,526
WATER HEATING AND DEAERATING APPARATUS
Filed Sept. 9, 1927   3 Sheets-Sheet 1
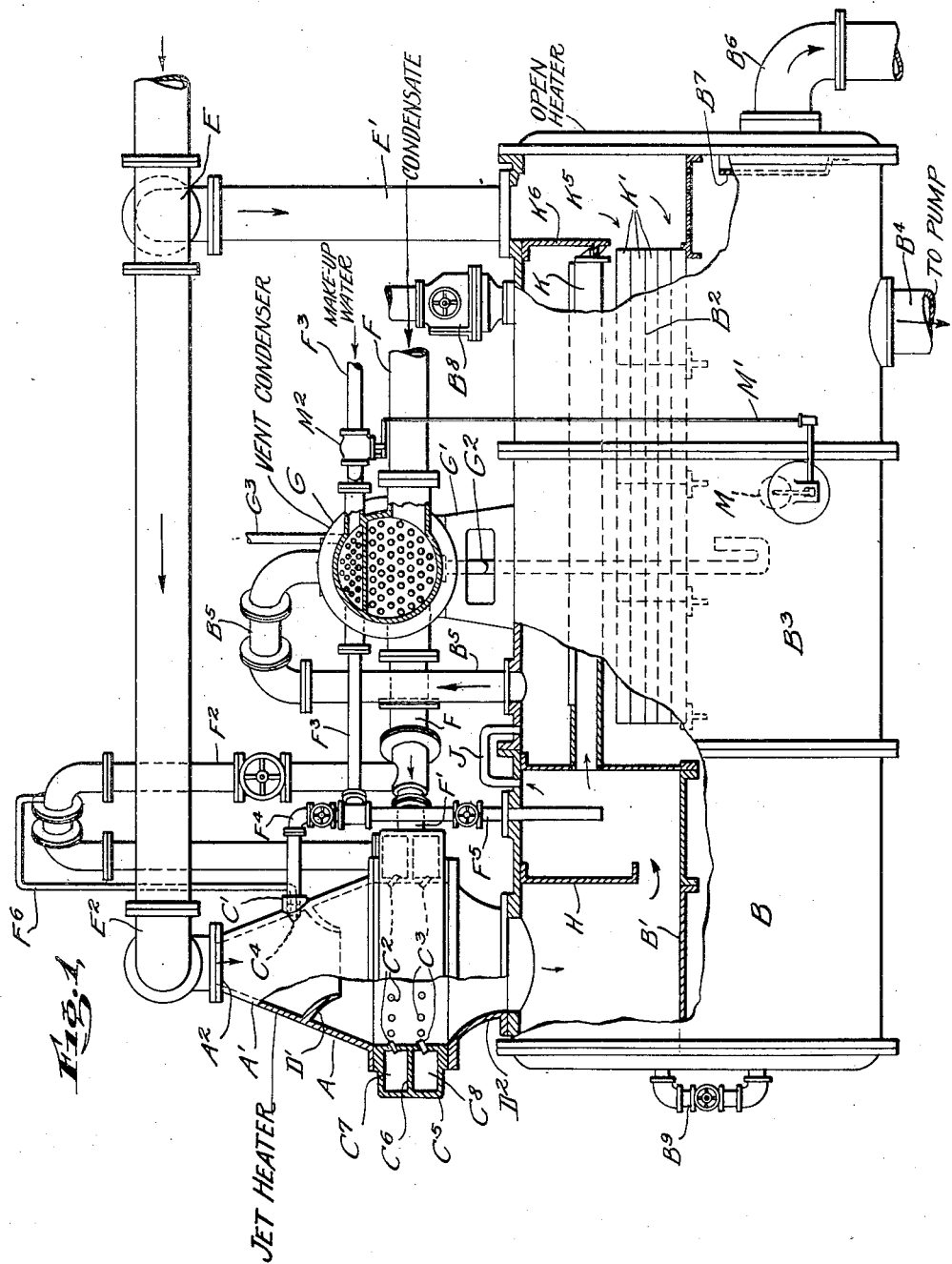
INVENTOR
JAMES A. POWELL
BY
John E. Hubbell
ATTORNEY

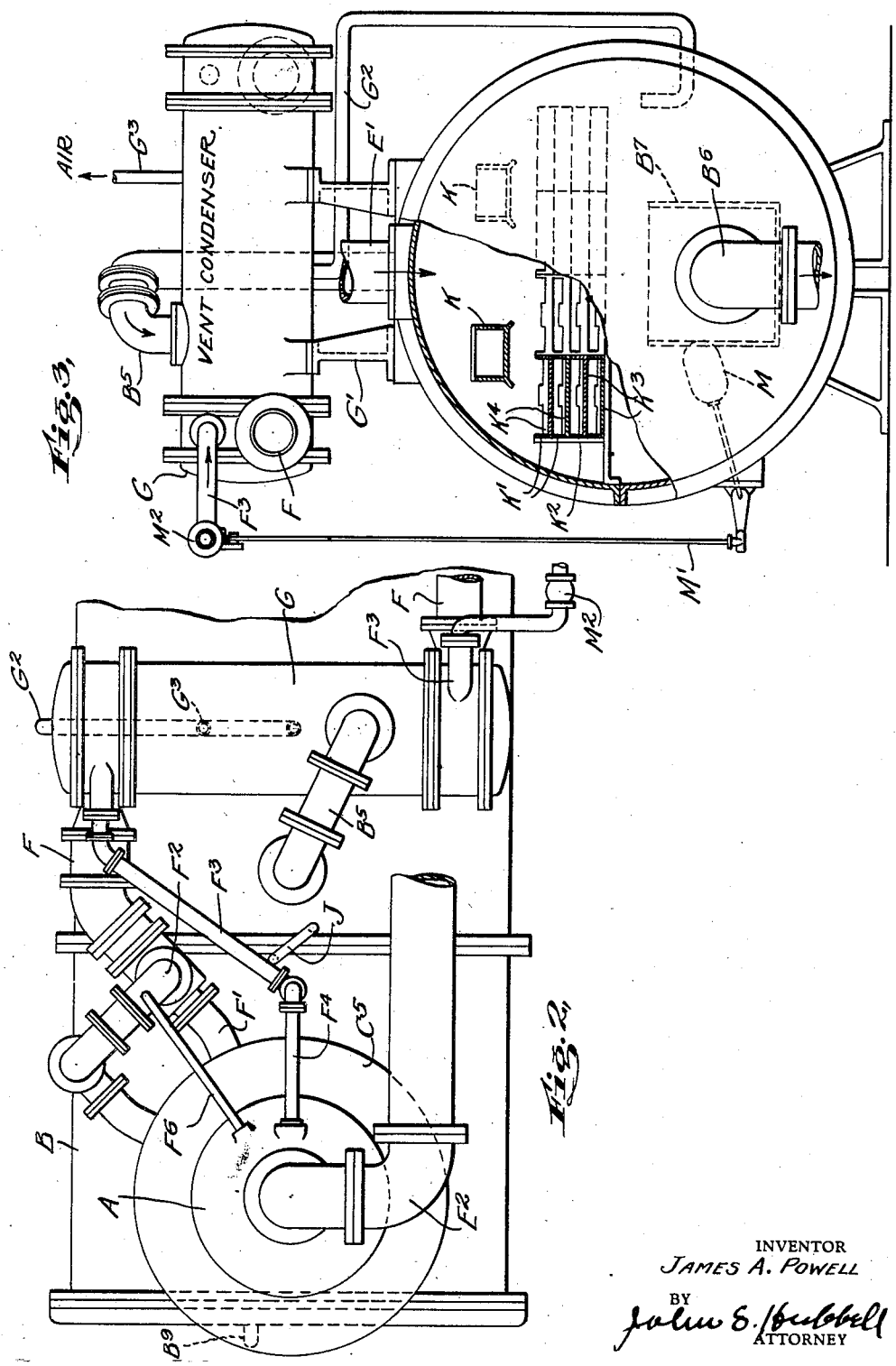

Jan. 12, 1932.   J. A. POWELL   1,840,526
WATER HEATING AND DEAERATING APPARATUS
Filed Sept. 9, 1927   3 Sheets-Sheet 3
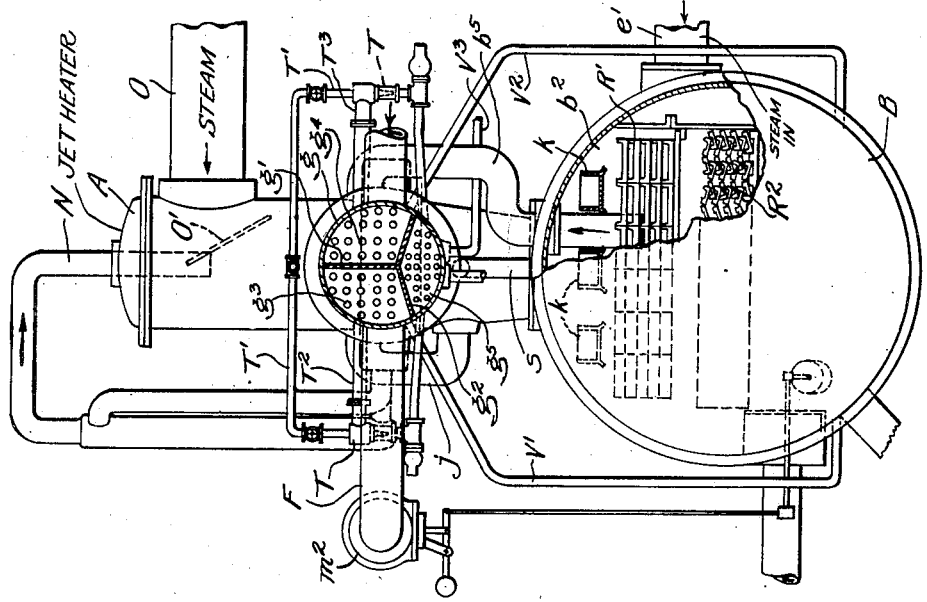
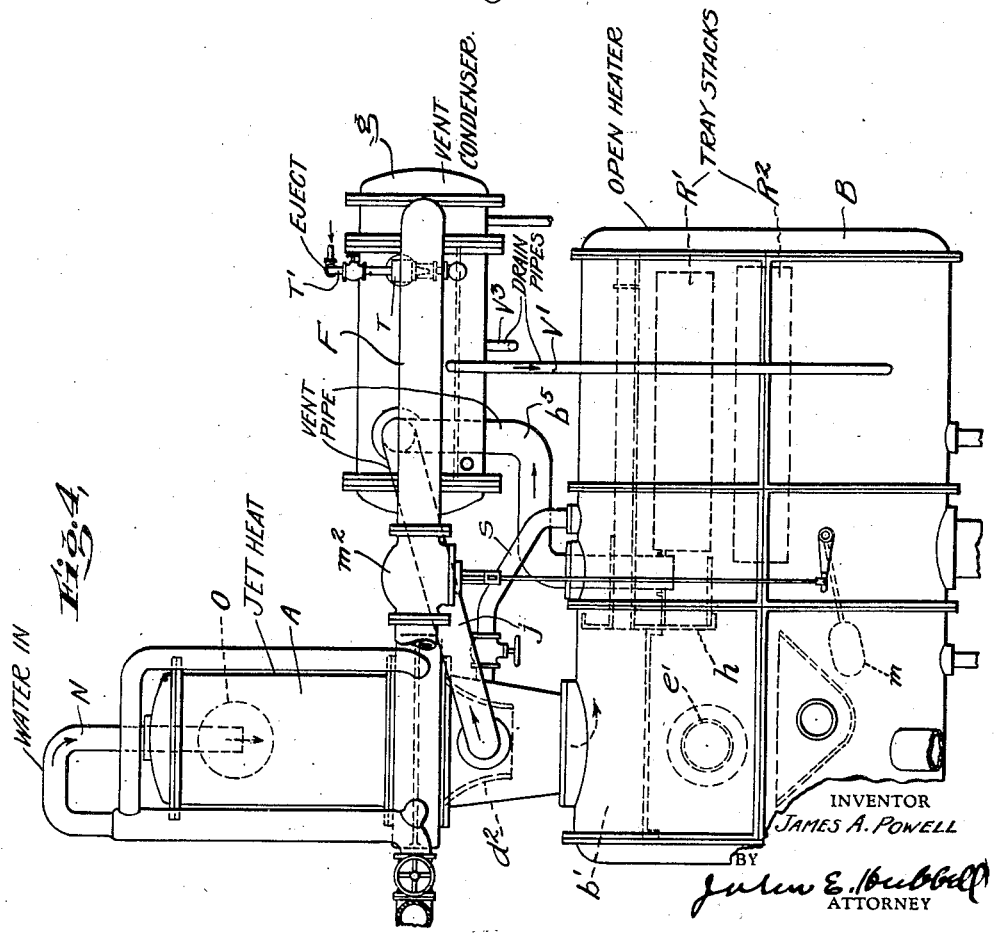
INVENTOR
JAMES A. POWELL
BY
ATTORNEY Patented Jan. 12, 1932

1,840,526

UNITED STATES PATENT OFFICE

JAMES A. POWELL, OF READING, PENNSYLVANIA, ASSIGNOR TO COCHRANE CORPORATION, OF PHILADELPHIA, PENNSYLVANIA, A CORPORATION OF PENNSYLVANIA

WATER HEATING AND DEAERATING APPARATUS

Application filed September 9, 1927. Serial No. 218,382.

The general object of my present invention is to provide an improved arrangement and construction of apparatus for efficiently heating and deaerating water. More specifically the object of my present invention is to provide water heating and deaerating apparatus in which a water heater of the jet or water spray type is effectively combined with an open water heater of the tray type, and in which the main water heating effect is attained in the jet heater, and the final deaerating and water heating effect is attained in the tray type heater. With my improved water heating and deaerating apparatus, I make use of the simplicity and compactness of structure and other advantageous characteristics of the jet or water spray type heater, and also obtain the water storage capacity and high deaerating properties which are characteristic of the tray type open water heater.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 1 is an elevation with parts broken away of a preferred arrangement and construction of my apparatus;

Fig. 2 is a plan view of the apparatus of Fig. 1;

Fig. 3 is an end view of the apparatus of Fig. 1 partly in section;

Fig. 4 is an elevation partly in section of a modified form of my invention; and Fig. 5 is an end view of the apparatus of Fig. 4.

In the drawings and particularly in Figs. 1, 2 and 3, I have illustrated a preferred embodiment of my invention comprising a jet heater A in combination with an open deaerating heater B for heating and deaerating boiler feed water.

The jet heater of my invention may well be, and as shown is of the general type illustrated in my prior Patent 1,621,853, granted March 22, 1927 and comprises a substantially cone shaped casing $A'$ having an exhaust steam inlet $A^2$ at the top thereof and provided with a single spray nozzle $C'$ and a plurality of series of water discharging nozzles $C^2$ and $C^3$ vertically spaced in the heater casing and arranged to discharge jets of water toward the vertical center line of the heater. The spray nozzle $C'$ has a perforated nozzle plate $C^4$ arranged to discharge a plurality of radial jets from one side of the heater casing in all directions. The lower nozzle series $C^2$ and $C^3$ are arranged in an annular casing $C^5$ surrounding the heater casing $A'$ and divided by a horizontal annular partition $C^6$ into upper and lower compartments $C^7$ and $C^8$. In the annular compartment $C^7$ is arranged the plurality of inclined spray nozzles $C^2$ and in the compartment $C^8$ the nozzle series $C^3$.

The jet heater is provided with means for intermingling the water with the steam and other gases after the steam has passed through the water barrier formed by the spray nozzles. In the construction shown, an annular converging baffle $D'$ is arranged below the spray nozzle $C'$. The portion of the casing $A'$ below the nozzle series $C^2$ and $C^3$ is formed with a converging section $D^2$ connected at its lower end to an inlet compartments $B'$ of the deaerating heater B.

The steam supply for the jet heater passes from the auxiliary apparatus (not shown) through a multi-port valve E and the pipe $E^2$ to the steam inlet $A^2$ of the heater. The water supply for the nozzle series $C^2$ and $C^3$ consists of the condensate from the condensers or other apparatus which is passed through the pipe F into a vent condenser G supported on and above the deaerator B by standards $G'$. In the vent condenser, the condensate is passed through a plurality of pipes extending longitudinally of the condenser wherein it is heated by the air and other non-condensable gases from the heaters A and B. The heated condensate passes from the condenser through the pipes F and $F'$ to the lower compartment $C^8$ of the annular casing $C^5$ where it is discharged into the casing through the nozzles C².

The supply of water to the nozzles C² in the upper compartment C⁷ is controlled in such a manner that water is not discharged through these nozzles until the water supply is more than sufficient for the lower series C³. In the construction shown, a vertical loop pipe section F² is connected at one end to the pipe F and has its other leg connected into the upper part of the compartment C⁷. With this arrangement, the nozzles C² will not discharge water until the head in the pipe F is sufficient to force the water through the vertical loop F². This arrangement is especially advantageous where the water supply is very low at periods and provides at least one water barrier extending across that portion of the heater. The water supply for the spray nozzle C' consists in the cold make-up water which is passed through a horizontal pipe section in the upper part of the vent condenser G and after being heated therein is passed through the pipe F³ and the valved pipe F⁴ to the spray nozzle C'.

A valved branch pipe F⁵ extends downwardly from the pipe F³ into the reservoir compartment of the heater B to provide means for adding make-up water directly to the heater B. An equalizing pipe connection F⁶ is arranged between the top of the loop and the jet heater casing to prevent any siphoning action in the loop section. The amount of cold make-up water which is required varies with the boiler load in contrast with the amount of condensate for the nozzles C² and C³, which remains substantially constant under varying boiler loads.

The open deaerating water heater B of the present invention is of the horizontal cylindrical type and comprises an outer shell enclosing an inlet water reservoir compartment B', into the top of which the lower end of the jet heater is connected for receiving the discharged mixture of water and gases, a tray compartment B² wherein the water is further heated and deaerated and a water storage compartment B³ at the bottom of the heater. The mixture of water, air and other non-condensable gases passes into the compartment B' at one end thereof and is directed around a depending vertical baffle H to a vent pipe J mounted in the top of the other end of the compartment and having its opposite end connected to the tray compartment B² at a point adjacent a vent pipe B⁵ from the tray compartment. The mixture passing into the water pool in the compartment B' constantly agitates the mixture in that compartment and separates out most of the air and gases entrained by the water in its passage through the lower part of the heater A, the gases passing out through the vent pipe J.

The water and condensed steam from the jet heater accumulates in the bottom of the compartment B' until its level is sufficient to overflow into and fill a pair of rectangular water boxes K extending substantially throughout the tray compartment B². Each water box K is located above and supported by a bank of superposed deaerating and heating trays K'. Each of the trays K' is supported by frame work K² secured to the heater shell. The trays K' are vertically spaced from one another and each comprises a horizontal perforated bottom plate K³ and upturned side and end walls K⁴ on which is supported the upper adjacent tray.

At the bottom of the water storage compartment B³ is located a water outlet B⁴ to the boiler feed pump (not shown). At one end of the compartment B³ is located an overflow outlet B⁶ having a skimmer baffle B⁷ at its inner end and arranged to remove the surplus water when the water level rises above the upper end of the baffle. At the other end of the heater B is arranged a drain pipe B⁹ for draining water from the compartment B' to the storage space when the heater is to be cleaned or repaired.

In the operation of the deaerating heater described, steam is passed from the valve E through a vertical pipe E' into a steam inlet compartment K⁵ having a vertical baffle K⁶ on the inner side thereof extending downwardly to a point adjacent the upper row of trays K'. The water overflowing from the water boxes K passes downwardly in minute streams onto the trays K' where it flows through the perforated plates in a finely divided condition. The steam passes into the tray section flowing between and around the superposed trays in intimate contact with the downflowing water which is heated by the steam to such a temperature, approximately 212°, that the air and other non-condensable gases, if any, remaining in the water after its treatment in the jet heater are separated out by the action of the steam and pass out of the tray compartment through the vent pipe B⁵ together with the vented mixture from the vent pipe J. The deaerated water falls into the storage compartment from which it is removed as needed through the pump supply outlet B⁴. The vented mixture passes through the pipe B⁵ into the top of the condenser G where, after circulating around the condenser tubes, it passes to the atmosphere through the vertical pipe G³. The vent condenser G is provided with a drain pipe G² connecting the bottom of the condenser to the water storage compartment. An atmospheric relief valve B⁸ is mounted in the top of the heater shell for the usual purpose.

Automatic means are provided for regulating the flow of cold make-up water to the condenser G and nozzle C' in accordance with the water level in the storage compartment of the heater G. In the present construction the control means comprise a pivoted float M in the storage space operating a lever arm M′ to regulate a valve M² in the pipe line F³.

The apparatus disclosed is comparatively simple and forms an effective system for heating the water in stages and effectively freeing it from air and other gases held in the water. My invention is characterized by the effectiveness of the combination of heaters and the relatively low cost of construction of the type of heater disclosed.

In the modification illustrated in Figs. 4 and 5, the same general form and arrangement of apparatus is provided with some additional features of construction for special conditions of operation. The jet heater A of Figs. 4 and 5 is provided with two series of water discharge nozzles and a vertical downcomer water supply pipe N connected to the upper part of the jet heater and extending downwardly to a point adjacent a steam inlet O and deflecting baffle O′ located in the side of the heating chamber. The arrangement of the remaining parts are substantially the same as heretofore described, except for a vent pipe $j$ from the part of the heater adjacent to and behind the converging baffle $d^2$. The mixture of water, vapor and air passes through the jet heater with the same parallel flow as in the other construction and the air and gases are withdrawn by the pipe $j$ to a condenser $g$ divided into a number of separate compartments $g^3$, $g^4$ and $g^5$ by vertical and inclined baffles $g'$ and $g^2$ respectively.

The deaerating heater B of the modification is provided with a tray compartment $b^2$ containing a plurality of tray stacks R′ and R². In this construction, the tray stack R′ is constructed and arrnaged similarly to the stack K′ of the previous construction. The tray stack R² is below and vertically spaced from the stack R′ and comprises a plurality of oppositely inclined trays of lesser width than the trays of the stack R′ and which act to separate the air and other non-condensable gases from the water. Water boxes $k$ are located above the upper tray stack from which the water overflows onto the tray stack R′. A pressure equalizing pipe S connects the lower part of the heater A with the upper part of the tray compartment of the heater B.

With the modified construction described, steam is admitted through an inlet pipe $e'$ and passes below the reservoir compartment $b'$ and baffle $h$ and horizontally through the tray stack R² to the opposite end of the heater where the stream is reversed and returns through the baffles R′ to a vent pipe $b^5$ and the vent condenser $g$. The supply of condensate to the jet heater is regulated by the valve $m^2$ controlled by the float $m$ in the storage space of the deaerating heater. The vent pipes $j$ and $b^5$ are connected into separate compartments $g^3$ and $g^4$ respectively in the vent condenser $g$. The condenser $g$ is provided with a pair of steam jet ejector pumps T having a live steam inlet T′ and connections T² and T³ to the compartments $g^3$ and $g^4$ through which the vent gases are withdrawn by the ejector. The ejected gases and steam are arranged to discharge through the condenser compartment $g^5$ where the greater portion of the heat content of the mixture is given up to the water in the pipes. Drain pipes V′ V² and V³ connect the condenser compartments $g^3$, $g^4$ and $g^5$ respectively to the storage space of the heater. The separation of the vent pipes is especially advantageous as with a single connection from both heaters the vent condenser capacity might be absorbed entirely by the gases issuing from one of the heaters and the gases from the other heater excluded or at least inefficiently removed.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Apparatus for heating and deaerating boiler feed water comprising the combination with a jet heater having a heating chamber wherein steam is mixed with water discharged from a series of discharge nozzles, of an open deaerating heater having a water reservoir space receiving the discharge mixture from said jet heater, a tray stack located at one side of said reservoir space and a water box receiving the overflow from said reservoir space and adapted to pass water downwardly onto said tray stack.

2. Apparatus for heating and deaerating boiler feed water comprising the combination with a jet heater having a heating chamber, spray nozzles discharging water into said chamber to form a water barrier across a section of said heating chamber and means for passing steam downwardly through said barrier, of an open deaerating water heater having an inlet reservoir compartment connected to said jet heater and receiving the discharge therefrom, a tray compartment receiving the overflow from said reservoir compartment, means for passing said water downwardly through said tray compartment, and means for passing steam in intimate contact with said water, whereby the boiler feed water is heated and deaerated by a two stage treatment.

3. Apparatus for heating and deaerating boiler feed water comprising the combination with a jet heater having a heating chamber, water discharge nozzles forming a water barrier through one section of said chamber, and means for passing steam downwardly through said heater for heating and deaerating said water, of an open deaerating water heater having an inlet reservoir compartment connected to the lower end of said jet heater and receiving the discharge therefrom, a tray stack compartment having a water connection with said inlet compartment, means for passing water downwardly through said tray stack in a finely divided condition and means for passing steam in intimate contact with said downflowing water, and means for separately venting each of said heaters to a vent condenser.

4. Apparatus for heating and deaerating boiler feed water comprising the combination with a jet heater having a heating chamber wherein steam is mixed with water discharged from a series of discharge nozzles, of an open deaerating heater having a water reservoir space receiving the discharge mixture of water and gases from said jet heater, a tray stack located at one side of said reservoir space, a water box receiving the overflow from said reservoir space and adapted to pass water downwardly onto said tray stack, means for passing steam horizontally through said tray stack, a vent condenser having separate compartments therein, and a conduit connecting one of said compartments with the top of the tray compartment and a second conduit connecting another of said compartments with the lower portion of said jet heating chamber.

5. Apparatus for heating and deaerating water comprising the combination with a heater of the jet type wherein water to be heated and deaerated is subjected to the heating and deaerating action of steam, of an open deaerating tray heater extending horizontally below said jet heater and having a water reservoir compartment arranged to receive the water discharged from the latter, a tray compartment in said tray heater having a substantially horizontal bank of trays below and at one side of the point of discharge from said jet heater, means for passing steam horizontally through said tray bank and means for venting of said tray compartment through an opening in the top of said heater adjacent said reservoir compartment.

6. Apparatus for heating and deaerating water comprising the combination with a heater of the jet type wherein water to be heated and deaerated is subjected to the action of steam, of an open deaerating heater extending horizontally below said jet heater and arranged to receive the water discharged from the latter, a substantially horizontal bank of trays adjacent the point of discharge from said jet heater, a condenser, and means for passing the mixture including the air liberated from the water in each heater separately into said condenser.

7. Apparatus for heating and deaerating water comprising the combination with a heater of the jet type wherein water to be heated and deaerated is subjected to the action of steam, of an open deaerating heater extending horizontally below said jet heater and arranged to receive the water discharged from the latter, a substantially horizontal bank of trays below and at one side of the point of discharge from said jet heater, a condenser having a plurality of separate compartments, and means for separately connecting each heater to separate compartments of the condenser for passing an air-steam mixture including the air liberated from the water in each heater into said condenser.

Signed at Reading, in the county of Berks and State of Pennsylvania, this 7th day of September, A. D. 1927.

JAMES A. POWELL.